Jan. 4, 1955   F. D. SAWYER   2,698,564
IMPLEMENT HITCH FOR TRACTORS
Filed Nov. 1, 1951   2 Sheets-Sheet 1
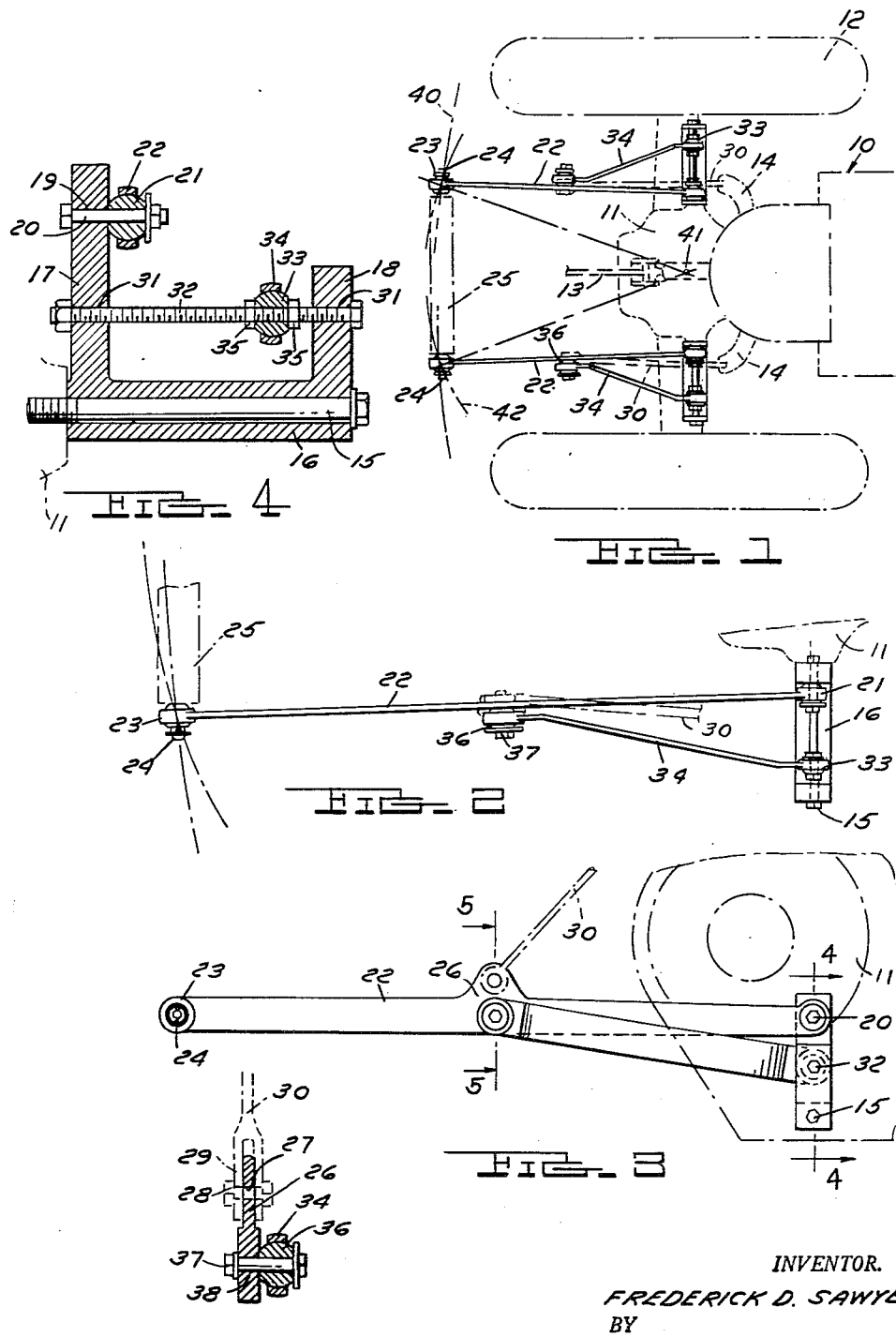
INVENTOR.
FREDERICK D. SAWYER
BY
ATTORNEY

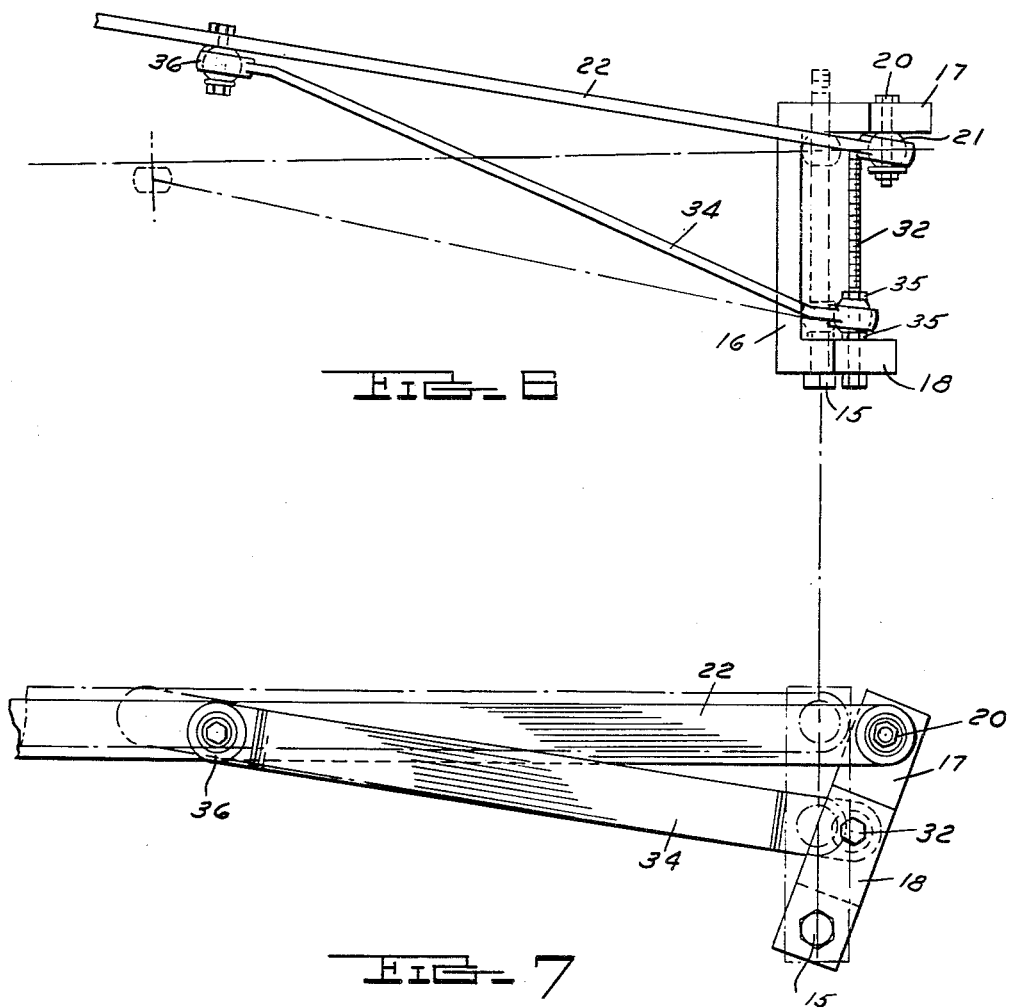

2,698,564
Patented Jan. 4, 1955

2,698,564

IMPLEMENT HITCH FOR TRACTORS

Frederick D. Sawyer, Wayne, Mich., assignor, by mesne assignments, to Ford Motor Company, Dearborn, Mich., a corporation of Delaware Application November 1, 1951, Serial No. 254,384

6 Claims. (Cl. 97—47.66)

The present invention relates to an implement hitch for tractors and more particularly to such a hitch wherein forwardly convergent, laterally spaced pairs of trailing, laterally swingable hitch link elements are utilized to connect an implement to a tractor for implement steering movement about an effective steering point other than the theoretical convergence point of the link elements.

There have been disclosed in the prior art various types of linkage arrangements for attaching a trailed implement to a tractor, so that the implement more or less follows tractor steering. Such prior arrangements typically utilize laterally spaced and universally pivoted draft links mounted on the tractor and forwardly convergent toward a theoretical pivot point located in the vicinity of the tractor front axle. Although the implement is thus steered to follow tractor steering, unbalanced side draft forces generated during the working of certain implements, such as moldboard plows, disc plows and the like, are reflected at the link theoretical convergence point so as to materially interfere with tractor steering, and the implement, in attempting to follow steering of the tractor front wheels, does not follow the tractor properly when such implements are utilized.

The present invention now provides an improved linkage arrangement wherein the the steering characteristics of forwardly convergent draft links may be selectively modified, so that the effective steering point, and incidentally the point of imposition of unbalanced side draft forces, is adjustable so that the steering point may be located in the vicinity of the tractor rear axle, the tractor steering axle, or therebetween. The location of the steering point at the rear axle is particularly advantageous since, by this arrangement, the side draft forces are absorbed by the tractor rear traction tires, and the effective steering point is located in closer proximity to the implement to improve implement following characteristics, as upon relatively sharp turns.

In accordance with the principles of the present invention, the linkage steering characteristics are modified by use of secondary link elements pivoted to each of the primary link elements, and the associated primary and secondary link elements are additionally connected through a pivoted crank arm which laterally spaces corresponding ends of the elements. Upon relative lateral implement-tractor movement, the differential lateral movement of the primary and secondary elements is imposed upon the linkage, with resultant movement of the draft links being limited and modified by the secondary link elements.

The extent of limitation and modification of draft link movement is determined, at least in part, by the lateral spacing of the corresponding ends of the links, and adjustment of this spacing adjusts the location of the effective steering point about which an implement carried by the links is steered. In general, the implement steering radius, i. e., the distance from the implement to the effective steering point, increases as the lateral spacing between the corresponding ends of the primary and secondary links decreases.

It is, therefore, an important object of the present invention to provide an improved tractor-implement linkage wherein the implement steering characteristics of a pair of forwardly convergent laterally swingable draft links are modified by a pair of associated laterally swingable secondary links effective to limit lateral movement of the draft links.

Another object of the present invention is the provision of an implement hitch including primary laterally swingable draft links attachable to an implement and secondary links pivoted to the primary links and adapted to vary the path of movement of the implement upon relative tractor-implement movement.

It is a further important object to provide an implement hitch including forwardly convergent trailing primary links for connecting an implement to a tractor and secondary links forwardly divergent with respect to the primary links and pivotally attached thereto to modify the steering characteristics of the primary links.

Still another object is the provision of an implement hitch including spaced pairs of link elements pivoted to one another and forwardly divergent in a lateral plane with the divergence of the pairs of elements being adjustable to vary the effective steering point about which an implement is steered by the hitch.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary plan view of a tractor and implement cross shaft connected by a hitch of the present invention;

Figure 2 is an enlarged plan view of the hitch alone;

Figure 3 is a side elevational view of the hitch of Figure 2;

Figure 4 is a greatly enlarged sectional view, with parts shown in elevation, taken along the plane 4—4 of Figure 3;

Figure 5 is a greatly enlarged sectional view, with parts shown in elevation, taken along the plane 5—5 of Figure 3;

Figure 6 is a fragmentary, greatly enlarged, somewhat diagrammatic view of the linkage of Figure 2 moved to an adjusted position; and Figure 7 is a side elevational view similar to Figure 6 again illustrating the linkage in an adjusted position.

As shown on the drawings:

In Figure 1, reference numeral 10 refers generally to a tractor, such as a well-known Ford tractor, having a rear axle housing 11 interposed between rear tractor wheels 12 and carrying an upper link 13 connectable to an implement as is well-known in the art. The tractor 10 is also provided with a pair of outwardly and rearwardly projecting, power-liftable rock arms 14 adapted to be actuated by a conventional tractor hydraulic system.

As best illustrated in Figures 1–4, inclusive, the tractor rear axle housing 11 threadedly receives laterally extending pivot bolts 15 upon which are disposed link mounting brackets 16. Each of the brackets 16 includes an inner upstanding crank arm 17 and a somewhat shorter outer crank arm 18, the crank arms being carried by the bracket for pivoting movement therewith in a vertical plane about the bolt 15.

The inner arm 17 of each bracket 16 is laterally apertured as at 19 (Figure 4) to receive a pivot bolt 20 securing to the arm a segmental spherical attachment bearing 21 carried at the forward end of a rearwardly extending primary link element 22. The primary link element 22 is provided at its rear end with a second segmental spherical attachment bearing 23 which is adapted for attachment to laterally outwardly projecting attachment pins 24 carried by the cross shaft 25 of an implement. As best seen in Figure 5, the primary elements 22 are each provided with an upstanding attachment ear 26 intermediate their length, the ears being apertured as at 27 to receive therethrough a pivot bolt 28 joining the terminal clevis 29 of a lift arm 30 thereto. The lift arms 30 are pivotally attached to the power-liftable rock arms 14, so that the primary link elements 22 may be power-lifted upon actuation of the tractor hydraulic system.

The laterally spaced arms 17 and 18 of the brackets 16 are provided with laterally aligned apertures 31 adapted to receive therethrough an elongated exteriorly threaded pivot bolt 32 upon which is slidably disposed a segmental spherical attachment bearing 33 carried at the forward end of a secondary link element 34. The link element is adjusted laterally along the pivot bolt 32 by means of stop nuts 35 positioned on each side of the bearing 33. As best seen in Figures 1, 2 and 6, the secondary link elements 34 are provided with rear segmental spherical attachment bearings 36 mounted upon pivot pins 37 and extending through apertures 38 formed in the primary link elements 22 in substantial vertical alignment with the lift arm ears 26. It will be seen from the drawings that the forward ends of the link elements 22 and 34, respectively, are divergent and the degree of lateral divergence is adjustable by movement of the attachment bearings 33 laterally along the length of the bolts 32. The primary link elements 22 are forwardly convergent with respect to one another and with respect to the tractor. As is conventional in the use of forwardly convergent links, if the links 22 alone were utilized the implement cross shaft 25 would be steered, as in the arc 40, about the theoretical point of convergence of the links, which is conventionally located in the vicinity of the tractor front axle.

However, the present invention utilizes the pair of secondary links 34 pivoted to a medial portion of the primary links 22 to modify the normal steering movements of the draft links. This action is best illustrated in Figures 6 and 7 of the drawings wherein it will be seen that relative lateral movement of the implement with respect to the tractor will cause lateral swinging of both the link elements 22 and 34 of each pair of elements. This lateral swinging movement will also cause movement of the bracket 16 in a vertical plane about the bracket bolt 15. Vertical movement of the bracket will effect differential movement of the elements 22 and 34 because of the difference in the lengths of the effective crank arms 17 and 18. In other words, the bracket will be rocked vertically with greater longitudinal displacement of the elements 22 than of the elements 34. In addition to this differential longitudinal movement, the different lengths of the arms 34 and 32 will cause lateral movement about a point other than the theoretical point of convergence of the links 22.

Actually, the combined differential vertical and lateral movement of the links will cause the implement cross shaft 25 to swing laterally as though it were pivoted about a point other than the theoretical convergence point of the primary links 22, such as the point 41 located centrally of the rear axle housing 11. Thus the drawbar will be steered in an arc 42 having its center of rotation, i. e., its effective steering point, located at the point 41.

Thus the secondary link elements 34 limit the swinging movement of the elements 22 in a lateral plane, and such limiting movement is the result of the different lengths of the elements, the different lengths of the vertical crank arms to which they are pivoted and the degree of lateral divergence of the elements. By adjustment of the pivot point of the arm 34 laterally along the bolt 32, the location of the effective steering point 41 may be varied with the length of the effective steering radius being inversely proportional to the distance between the element bearings 21 and 33.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a tractor-implement linkage, a pair of laterally spaced forwardly convergent primary link elements, a secondary link element pivotally attached to each of said primary link elements intermediate the length thereof, and a pair of steering crank arms each respectively pivotally connected to and joining the free end of one of said primary elements to the corresponding one of said secondary link elements, said crank arms also being pivoted for movement about fixed pivot points, whereby movement of said crank arms about said fixed pivot points results in movement of said primary link elements, movement of said primary elements being restricted by said secondary elements to an arcuate path different from the path of movement of said primary elements alone.

2. In a tractor-implement linkage, spaced attachment brackets attachable to the tractor rear axle for movement about a lateral pivot axis and each providing laterally spaced crank arm portions, a trailing primary link pivotally attached to a first crank arm portion of each of said brackets respectively, a pair of primary links thus provided being laterally convergent toward a forwardly located theoretical convergence point, a secondary link pivoted to a medial portion of each of said primary links and to a second crank arm portion of each of said brackets respectively, and attachment means on said primary links for securing the same to an implement, whereby the combined pivoting action of said elements effectively steers said implement about a point different from said theoretical convergence point.

3. In a tractor-implement linkage, laterally spaced pairs of draft links including primary links forwardly convergent toward a fixed theoretical center, crank members pivotally carrying one end of said primary links respectively and adapted to be pivoted to the tractor, secondary links also pivoted to said crank members in laterally spaced relation to said primary links and pivoted to a medial portion of said primary links, and means accommodating lateral adjustment of said secondary links relative to said primary elements.

4. In a tractor-implement linkage, a pair of laterally spaced brackets each adapted to be secured to a tractor for pivoting movement in a vertical plane and each providing a pair of laterally spaced crank arms of different lengths, trailing primary draft link elements universally connected to corresponding crank arms of said brackets respectively, a secondary draft link pivotally secured to each of the others of said crank arms and attached to medial portions of said primary links respectively, and means at the free trailing ends of said primary links for attaching an implement thereto, whereby relative lateral tractor-implement movement will effect pivoting movement of said bracket and the differential effective lengths of said elements will cause limitation of the lateral swinging of said primary element to modify the steering characteristics thereof.

5. In a tractor-implement linkage, a pair of laterally spaced brackets each adapted to be secured to a tractor for pivoting movement in a vertical plane and each providing a pair of laterally spaced crank arms of different lengths, trailing primary draft link elements secured to corresponding crank arms of said brackets respectively for universal pivotal movement, a secondary draft link pivotally secured to each of the others of said crank arms and attached to medial portions of said primary links respectively, means at the free trailing ends of said primary links for attaching an implement thereto, and means for varying the lateral distance between the forward ends of said elements, whereby relative lateral tractor-implement movement will effect pivoting movement of said bracket and the differential effective lengths of said elements will cause limitation of the lateral swinging of said primary element to modify the steering characteristics thereof.

6. In combination with a pair of trailing, tractor-mounted primary draft links, means interposed between said primary links and said tractor for providing crank arms to which said primary links are pivoted, said crank arms being movable solely in a vertical plane, said means also providing second crank arms respectively laterally spaced from and of different lengths than said first-named crank arms, and secondary draft links pivoted to said second crank arms and to a medial portion of said primary links, whereby differential pivoted movement of said primary and secondary links is effected by the pivoted movement of said crank arms to change the effective lengths of said links.

References Cited in the file of this patent

UNITED STATES PATENTS

| Number | Name | Date |
|---|---|---|
| Re. 22,912 | Gaertner | Sept. 9, 1947 |
| 1,759,063 | Paul | May 20, 1930 |
| 1,916,945 | Ferguson | July 4, 1933 |
| 2,398,365 | Ellis | Apr. 16, 1946 |
| 2,433,019 | Arps | Dec. 23, 1947 |
| 2,438,553 | Fraga | Mar. 30, 1948 |
| 2,462,726 | Currie | Feb. 22, 1949 |
| 2,545,739 | Martin | Mar. 20, 1951 |